United States Patent
Rippon

(10) Patent No.: US 12,449,550 B2
(45) Date of Patent: Oct. 21, 2025

(54) GNSS AUTHENTICATION THROUGH MULTI-SITE OBSERVABLES AND DATA COMPARISONS

(71) Applicant: Schweitzer Engineering Laboratories, Inc., Pullman, WA (US)

(72) Inventor: Daniel B. Rippon, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 352 days.

(21) Appl. No.: 18/187,781

(22) Filed: Mar. 22, 2023

(65) Prior Publication Data

US 2024/0319381 A1    Sep. 26, 2024

(51) Int. Cl.
G01S 19/21    (2010.01)

(52) U.S. Cl.
CPC ................. *G01S 19/215* (2013.01)

(58) Field of Classification Search
CPC .............................. G01S 19/20–215
See application file for complete search history.

(56) References Cited

U.S. PATENT DOCUMENTS

| | | |
|---|---|---|
| 5,160,926 A | 11/1992 | Schweitzer, III |
| 5,557,284 A | 9/1996 | Hartman |
| 5,737,715 A | 4/1998 | Deaton |
| 6,144,334 A | 11/2000 | Claffey |
| 6,229,479 B1 | 5/2001 | Kozlov |
| 6,483,856 B1 | 11/2002 | Bird |
| 7,146,516 B2 | 12/2006 | Dhupar |

(Continued)

FOREIGN PATENT DOCUMENTS

| | | | |
|---|---|---|---|
| KR | 101503001 B1 | * | 3/2015 |
| WO | 9747987 | | 12/1997 |

(Continued)

OTHER PUBLICATIONS

Tippenhauer, N.O., Popper, C., Rasmussen, K.B., Capkun, S., On the Requirements for Successful GPS Spoofing Attacks, In Proceedings of the ACM Conference on Computer and Communications Security (CCS), Oct. 2011.

(Continued)

*Primary Examiner* — Cassi J Galt
(74) *Attorney, Agent, or Firm* — Fletcher Yoder P.C.

(57) ABSTRACT

Systems, methods, and devices for protecting against spoofing of Global Navigation Satellite System (GNSS) data are provided. An electronic device may include memory and one or more processors that execute instructions to cause operations to identify potential GNSS spoofing. The operations may include obtaining a first distance between a first GNSS receiver and a second GNSS receiver, obtaining first GNSS data indicating a first range measurement between a first GNSS satellite and the first GNSS receiver, obtaining second GNSS data indicating a second range measurement between the first GNSS satellite and the second GNSS receiver, and calculating a first expected range measurement between the second GNSS receiver and the first GNSS satellite based at least in part on the first distance and the first range measurement. Spoofing may be determined to have occurred based on a comparison between the first expected range measurement and the second range measurement.

20 Claims, 5 Drawing Sheets

(56) References Cited

U.S. PATENT DOCUMENTS

| | | | |
|---|---|---|---|
| 7,310,062 B1 * | 12/2007 | Hwang | G01S 19/215 342/357.59 |
| 7,375,683 B2 | 5/2008 | Smith | |
| 7,398,411 B2 | 7/2008 | Zweigle | |
| 7,436,232 B2 | 10/2008 | Sivero | |
| 7,440,427 B1 | 10/2008 | Katz | |
| 7,606,541 B1 | 10/2009 | Nicholls | |
| 7,940,213 B2 | 5/2011 | Harper | |
| 7,952,519 B1 | 5/2011 | Nielsen | |
| 7,978,130 B1 | 7/2011 | Cohen | |
| 7,979,228 B2 | 7/2011 | Zurbuchen | |
| 8,055,288 B2 | 11/2011 | Ladd | |
| 8,138,972 B2 | 3/2012 | Underbrink | |
| 8,159,391 B2 | 4/2012 | Papadimitratos | |
| 8,237,609 B2 | 8/2012 | Talbot | |
| 8,325,087 B2 | 12/2012 | Thomson | |
| 8,326,319 B2 | 12/2012 | Davis | |
| 8,446,896 B2 | 5/2013 | Bedrosian | |
| 8,564,330 B1 | 10/2013 | Radulov | |
| 8,655,608 B2 | 2/2014 | Guzman-Casillas | |
| 8,867,520 B2 | 10/2014 | Nicholls | |
| 9,083,503 B2 | 7/2015 | Sagen | |
| 9,270,442 B2 | 2/2016 | Rice | |
| 9,300,591 B2 | 3/2016 | Rajasekaran | |
| 9,319,100 B2 | 4/2016 | Achanta | |
| 9,400,330 B2 | 7/2016 | Achanta | |
| 9,520,860 B2 | 12/2016 | Whitehead | |
| 9,599,719 B2 | 3/2017 | Achanta | |
| 9,709,682 B2 | 7/2017 | Achanta | |
| 9,759,816 B2 | 9/2017 | Achanta | |
| 10,122,487 B2 | 11/2018 | Whitehead | |
| 10,288,741 B2 | 5/2019 | Achanta | |
| 10,375,108 B2 | 8/2019 | Schweitzer, III | |
| 12,158,530 B2 * | 12/2024 | Revol | G01S 19/215 |
| 2002/0136172 A1 | 9/2002 | Chun | |
| 2002/0158693 A1 | 10/2002 | Soong | |
| 2002/0167934 A1 | 11/2002 | Carter | |
| 2003/0087654 A1 | 5/2003 | Wheeler | |
| 2003/0107513 A1 | 6/2003 | Abraham | |
| 2004/0062279 A1 | 4/2004 | Primrose | |
| 2004/0166879 A1 | 8/2004 | Meadows | |
| 2004/0228368 A1 | 11/2004 | Jecmen | |
| 2006/0259806 A1 | 11/2006 | Zweigle | |
| 2007/0132773 A1 | 6/2007 | Plante | |
| 2007/0194987 A1 | 8/2007 | Fedora | |
| 2008/0062039 A1 | 3/2008 | Cohen | |
| 2008/0169978 A1 | 7/2008 | Powell | |
| 2008/0186229 A1 | 8/2008 | Van Diggelen | |
| 2008/0198069 A1 | 8/2008 | Gronemeyer | |
| 2009/0079623 A1 * | 3/2009 | Nicholson | G01S 19/20 342/357.58 |
| 2009/0117928 A1 | 5/2009 | Ladd | |
| 2009/0160705 A1 | 6/2009 | Matsuzaki | |
| 2009/0315764 A1 | 12/2009 | Cohen | |
| 2010/0030916 A1 | 2/2010 | Greenwood Graham | |
| 2010/0034190 A1 | 2/2010 | Yun | |
| 2010/0073228 A1 | 3/2010 | Smith | |
| 2010/0117899 A1 | 5/2010 | Papadimitratos | |
| 2010/0127928 A1 | 5/2010 | Thomson | |
| 2010/0190509 A1 | 7/2010 | Davis | |
| 2010/0222068 A1 | 9/2010 | Gaal | |
| 2010/0231445 A1 | 9/2010 | Tarlow | |
| 2010/0231448 A1 | 9/2010 | Harper | |
| 2010/0253578 A1 | 10/2010 | Mantovani | |
| 2010/0254225 A1 | 10/2010 | Schweitzer, III | |
| 2011/0001668 A1 | 1/2011 | Cobb | |
| 2011/0035066 A1 | 2/2011 | Schweitzer | |
| 2011/0068973 A1 | 3/2011 | Humphreys | |
| 2011/0085540 A1 | 4/2011 | Kuwabara | |
| 2011/0102258 A1 | 5/2011 | Underbrink | |
| 2011/0102259 A1 | 5/2011 | Ledvina | |
| 2011/0169577 A1 | 7/2011 | Nicholls | |
| 2011/0181466 A1 | 7/2011 | Serrano | |
| 2011/0227787 A1 | 9/2011 | Gum | |
| 2011/0261917 A1 | 10/2011 | Bedrosian | |
| 2011/0285586 A1 | 11/2011 | Ferguson | |
| 2011/0287779 A1 | 11/2011 | Harper | |
| 2012/0005326 A1 | 1/2012 | Bradetich | |
| 2012/0026037 A1 | 2/2012 | Thomson | |
| 2012/0030495 A1 | 2/2012 | Chandhoke | |
| 2012/0066418 A1 | 3/2012 | Foster | |
| 2012/0116677 A1 | 5/2012 | Higgison | |
| 2012/0179404 A1 | 7/2012 | Lee | |
| 2012/0182181 A1 | 7/2012 | Dai | |
| 2012/0195253 A1 | 8/2012 | Irvine | |
| 2012/0195350 A1 | 8/2012 | Das | |
| 2012/0323397 A1 | 12/2012 | Schweitzer, III | |
| 2013/0157593 A1 | 6/2013 | Achanta | |
| 2013/0244624 A1 | 9/2013 | Das | |
| 2013/0328606 A1 | 12/2013 | Ravi | |
| 2013/0335266 A1 | 12/2013 | Vollath | |
| 2014/0003199 A1 | 1/2014 | Dougan | |
| 2014/0094218 A1 | 4/2014 | Hammes | |
| 2014/0100702 A1 | 4/2014 | Schweitzer | |
| 2014/0111249 A1 | 4/2014 | Whitehead | |
| 2014/0111377 A1 | 4/2014 | Achanta | |
| 2014/0114608 A1 | 4/2014 | Achanta | |
| 2014/0232595 A1 | 8/2014 | Rife | |
| 2014/0247185 A1 | 9/2014 | Achanta | |
| 2014/0250972 A1 | 9/2014 | Achanta | |
| 2014/0327574 A1 | 11/2014 | Achanta | |
| 2014/0334477 A1 | 11/2014 | Stahlin | |
| 2015/0043697 A1 | 2/2015 | Achanta | |
| 2015/0312023 A1 | 10/2015 | Rice | |
| 2015/0364953 A1 | 12/2015 | Rippon | |
| 2016/0154109 A1 * | 6/2016 | Achanta | G01S 19/20 342/357.58 |

FOREIGN PATENT DOCUMENTS

| | | |
|---|---|---|
| WO | 2012151006 | 11/2012 |
| WO | 2014005016 | 1/2014 |

OTHER PUBLICATIONS

Moore, P., Crossley, P., Gps Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of The Institute of Navigation (Ion Gnss 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

Shepard, D., Humphreys, T., Fansler, A., "Evaluation of the Vulnerability of Phasor Measurement Units to GPS Spoofing Attacks", Oct. 2, 2011.

Zhou et al., Adaptive Correction Method for an OCXO and Investigation of Analytic Cumulative Time Error Upper Bound, Jan. 2011, IEEE Transactions on Ultrasonics, Ferroelectrics, and Frequency Control, vol. 58, No. 1, pp. 43-50.

* cited by examiner

GNSS AUTHENTICATION THROUGH MULTI-SITE OBSERVABLES AND DATA COMPARISONS

BACKGROUND

The present disclosure generally relates to global navigation satellite system (GNSS) signals, and, more particularly, to techniques to ensure the integrity of GNSS signals received by different electronic devices, such as different intelligent electronic devices (IEDs) of an electric power delivery system.

Global navigation satellite systems (GNSS) may be utilized by a number of systems to provide common clock signals, along with other things. Many devices, such as those used in electric power delivery systems, may rely on the GNSS signals received by such satellite systems to be accurate enough to perform time-synchronized operations properly. Under certain circumstances, however, GNSS signals could be spoofed or otherwise altered. This could cause the systems relying on the GNSS signals to malfunction.

BRIEF DESCRIPTION OF THE DRAWINGS

Various aspects of this disclosure may be better understood upon reading the following detailed description and upon reference to the drawings in which.

DETAILED DESCRIPTION

Figure 1:
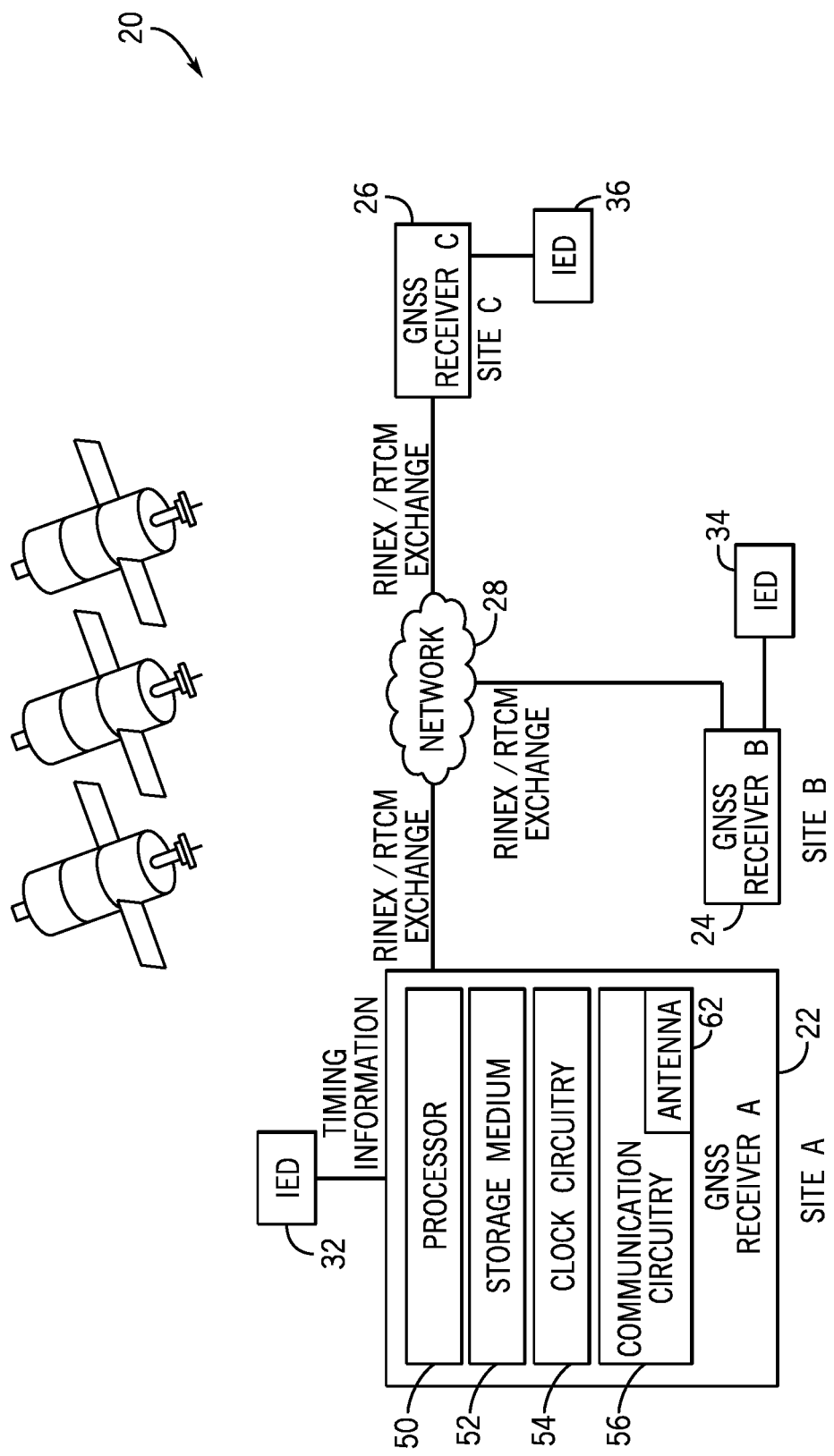
FIG. 1 illustrates a high-level network diagram of a communication system of GNSS receivers with GNSS satellites, in accordance with an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Global navigation satellite system (GNSS) is a term that describes a common set of satellites, such as Global Positioning System (GPS) and Global Navigation Satellite System (GLONASS), which provide positioning, navigation, and/or timing (PNT) services. Each satellite may provide a navigation message that contains the data parameters for a GNSS receiver to obtain a position, velocity, and time (PVT) solution, such as orbital parameters, clock offsets, satellite health, and coordinated universal time (UTC) offsets. Additionally, each satellite may encode the signal with a pseudo-random number. A respective GNSS receiver may receive the pseudo-random number and perform a correlation to compute a pseudo-range (i.e., a range estimate of the distance from the GNSS receiver to the GNSS satellite). With multiple satellites, the PVT of both the satellites and receiver may be precisely known. In normal operation, the position of a receiver can be known to within a few meters and with timing within <100 ns.

Because GNSS timing information may be broadcast across large areas, the timing information from GNSS satellites may be used as a common time reference across multiple electronic devices at different locations to allow the electronic devices to perform time-synchronized operations. For example, GNSS receivers may be used to improve protection of electric power delivery systems that generate, transmit, and distribute electrical energy to loads. Intelligent electronic devices (IEDs) may receive the common timing information from GNSS receivers. The IEDs may obtain electrical measurements, such as voltage and/or current measurements, of the electric power delivery system and time stamp the electrical measurements with the GNSS timing information. The IED may communicate the time stamped electrical measurements to other IEDs, also synchronized according to the same GNSS timing information, to enable better protection of the electric power delivery system. For instance, a first IED may determine that a second IED is expected to respond to a fault based on the synchronized GNSS timing information to allow the first IED to block tripping of a circuit breaker, thereby allowing a larger portion of a power system to remain online.

Electrical power generation and delivery systems may include equipment, such as electrical generators, electrical motors, power transformers, power transmission and distribution lines, circuit breakers (CBs), disconnects, buses, voltage regulators, capacitor banks, and the like. Such equipment may be monitored, controlled, automated, and/or protected using IEDs that receive electric power system information from the equipment, make decisions based on the information, and provide monitoring, control, protection, and/or automation outputs to the equipment.

GNSS receivers may use open, unencrypted, and unauthenticated radio frequency (RF) signals. This may result in the GNSS receivers to be vulnerable to manipulation when non-authentic signals are received. If the non-authentic signals manipulate either the range-measurement or navigation message (i.e., the data used in calculations), then the GNSS receivers may be brought to any arbitrary PVT, as desired by whoever produced the non-authentic, "spoofed" signals. Further, mistakes in communication signal distribution may result in inaccurate signals being received by GNSS receivers.

As explained below, electronic devices that use GNSS receiver information may detect or prevent spoofing of GNSS signals by validating signals across a geographic area and more than one GNSS receiver. Many GNSS receivers may be spaced from around 100 meters (m) to more than 1000 kilometers (km) apart. By validating the GNSS signals with multiple locations, it may be more difficult for the GNSS information to be spoofed. Indeed, in some embodiments customers may select certain locations, such as an operations center, to perform methods to validate GNSS signals. However, it should be noted that users may have numerous GNSS receiver locations to select from. For example, there may be publicly available GNSS receivers, such as the Continuously Operating Reference Stations (CORS) which may be located world-wide.

FIG. 1 is a high-level network diagram of a communication network 20 with multiple GNSS receivers that receive signals from GNSS satellites, such as GPS, GLONASS, etc. As illustrated, a first GNSS receiver 22 may be located at a first site (Site A), a second GNSS receiver 24 may be located at a second site (Site B), and a third GNSS receiver 26 may be located at a third site (Site C). The GNSS receivers 22, 24, and 26 may be communicatively coupled via a network 28, which may be any suitable communication network. For example, the network 28 may include a network switching device (e.g., an unmanaged/managed Ethernet switch), a supervisory control and data acquisition (SCADA) system, a wide area network (WAN), or the like.

As previously discussed, in some embodiments, the GNSS receivers 22, 24, and 26 may each be located at different sites. For example, each of the GNSS receivers 22, 24, and 26 may be installed in different substations of a power system. As mentioned above, the GNSS receivers 22, 24, and 26 may be communicatively coupled to electronic devices, such as IEDs 32, 34, and 36, to provide timing information to the IEDs 32, 34, and 36 to enable communication of time-synchronized power system data. The IEDs 32, 34, and 36 may each receive common timing information that is GNSS synchronized to enable the IEDs 32, 34, and 36 to align power system measurements to the common time to better monitor the power system. Each of the substations (e.g., Sites A, B, and C) may include a gateway device that allows electronic devices of the substation to communicate with devices outside the substation via an internet connection, for example, via the network 28. In some embodiments, the IEDs 32, 34, and 36 may be used for protection, control, automation, and/or monitoring of equipment in the system. For example, the IEDs 32, 34, and 36 may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment. Although IEDs and power systems are used as an example, the systems and methods described herein may be used with any suitable GNSS receivers 22, 24, and 26, such as GNSS receivers with an available location and communication capabilities.

The GNSS receivers 22, 24, and 26 may each communicate GNSS information with each other via the network 28. The GNSS receivers 22, 24, and 26 may communicate GNSS observation data in a format, such as in a Receiver Independent Exchange (RINEX) format and/or a Radio Technical Commission for Maritime Services (RTCM) Standard format. For example, the GNSS observation data may include pseudo-range, doppler, and carrier to noise density (CN0) measurements, as well as satellite status, and navigation messages. Further, the GNSS receivers 22, 24, and 26 may use data transfer protocols to communicate the GNSS observation data, such as network transport of RTCM over IP (NTRIP).

In some embodiments, the GNSS receivers 22, 24, and 26 may include internal circuitry to support their respective operations. In the illustrated example of FIG. 1, the GNSS receiver 22 is described as including certain circuitry. It should be noted that the circuitry included for the GNSS receiver 22 may be similar to the circuitry inside other GNSS receivers, such as the GNSS receivers 24 and 26.

In some embodiments, the GNSS receiver 22 may include a processor 50, a storage medium 52 (e.g., a computer-readable storage medium), communication circuitry 54, and clock circuitry 56. In some embodiments, the storage medium 52 may be embodied as memory, such as random access memory (RAM), read only memory (ROM), or a combination thereof, and may include or interface with software, hardware, or firmware modules for implementing various portions of the systems and methods described herein. Further, the storage medium 52 may be a repository of one or more modules and/or executable instructions configured to implement any of the processes described herein.

The processor 50 may operate using any suitable number of processing rates and architectures. The processor 50 may perform various algorithms and calculations described herein using computer executable instructions stored on the storage medium 52. The processor 50 may be embodied as a microprocessor. In certain embodiments, the processor 50 and/or the storage medium 52 may be embodied as discrete electrical components, a general purpose integrated circuit, one or more Application Specific Integrated Circuits ("ASICs"), a Field Programmable Gate Array ("FPGA"), and/or other programmable logic devices. The processor 50 and/or the storage medium 52 may be referred to generally as processing circuitry.

The communication circuitry 54 may include a GNSS antenna 62 that receives GNSS communication signals from one or more GNSS satellites. The communication circuitry 54 may also include communication ports, connectors, and transceivers, etc., that communicatively coupled the GNSS receiver 22 to communicate the GNSS timing information to other electronic devices, such as the IED 32. Although the IEDs 32, 34, and 36 are shown as communicatively coupled to the GNSS receiver 22, 24, and 26, in some embodiments, the GNSS receiver 22, 24, and 26 may be integrated into an electronic device, such as an IED. In some embodiments, the GNSS receiver 22 may include the clock circuitry 56 to maintain timing information of the GNSS receiver 22.

Figure 2:
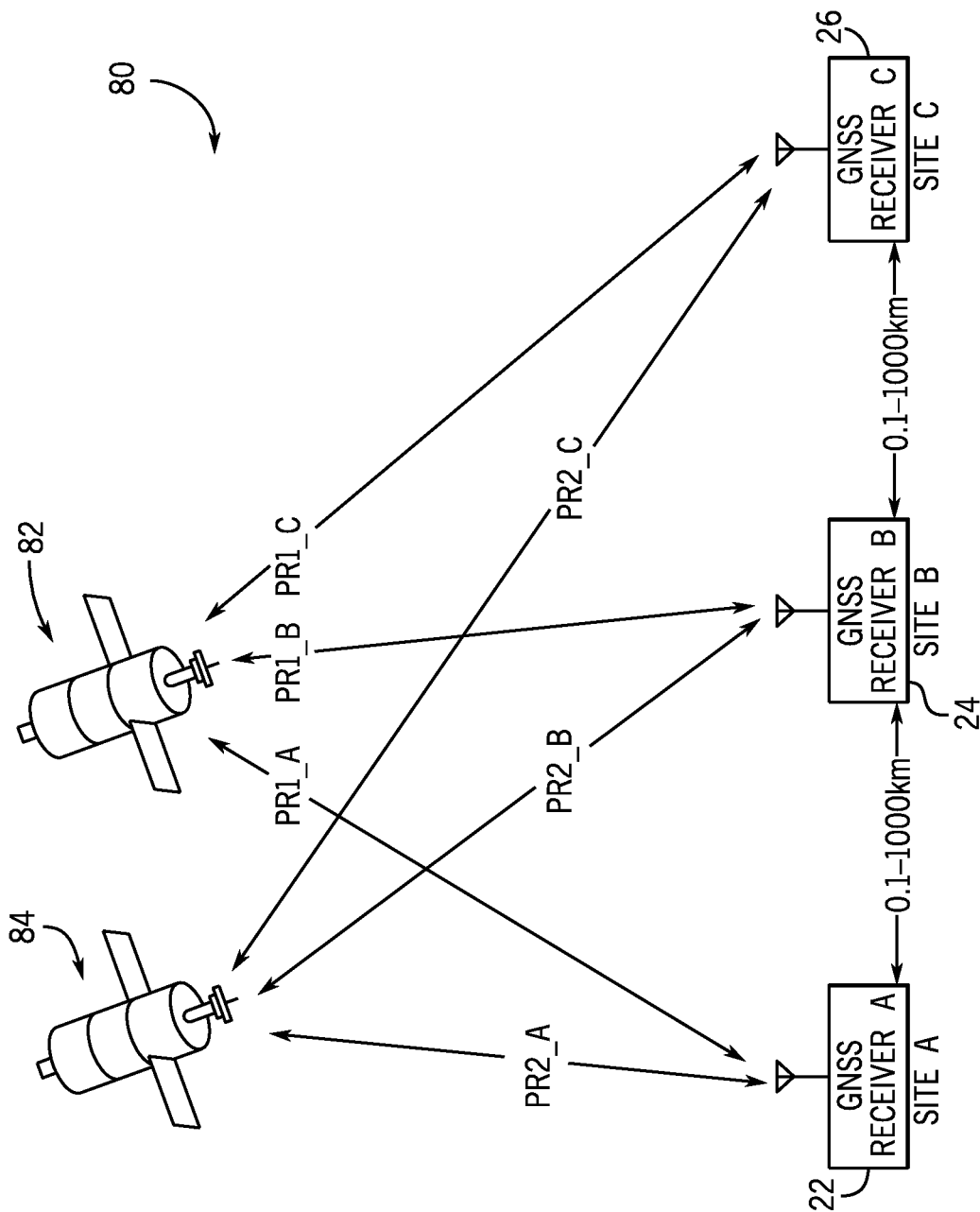
FIG. 2 is a diagram that illustrates range measurements from the GNSS satellites of a GNSS constellation to the GNSS receivers of FIG. 1, in accordance with an embodiment of the present disclosure.

Turning now to a description of operations of the GNSS receivers 22, 24, and 26, FIG. 2 illustrates a diagram of communications between GNSS satellites 82 and 84 of a GNSS constellation 80 with the GNSS receivers 22, 24, and 26. In some embodiments, the GNSS receivers 22, 24, and 26 may be installed (e.g., mounted) in a fixed location. The GNSS receivers 22, 24, and 26 may receive a receiver location (e.g., latitude, longitude, altitude, etc.) describing the positions of the GNSS receivers 22, 24, and 26. In some embodiments, an operator may provide the receiver location via inputs of the communication circuitry 54 of the GNSS receiver 22, 24, and 26. In other embodiments, the GNSS receiver 22, 24, and 26 may obtain the receiver location via a central monitoring station.

The GNSS satellites 82 and 84 may broadcast GNSS signals, such as a navigation data message containing ephemeris information (e.g., suitable to enable position, velocity, and/or time (PVT) to be determined) that allows for calculation of a satellite's position relative to earth at a particular time, and ranging signals that allow for a pseudo-range calculation (distance measurement between satellite and receiver). For example, the GNSS satellites 82 and 84 may broadcast data that allows for the calculation of each satellite's current location (e.g., latitude, longitude, altitude, etc.), velocity, and time of the GNSS satellite 82 and 84, respectively. The GNSS receivers 22, 24, and 26 may receive the GNSS signals from the GNSS satellites 82 and 84 to determine a pseudo-range between the GNSS satellites 82, 84 and the GNSS receivers 22, 24, and 26. For example, the GNSS receiver 22 may determine a first pseudo-range (PR1_A), which is an estimated distance between the GNSS satellite 82 and the GNSS receiver 22. The GNSS receiver 22 may further determine a second pseudo-range (PR2_A), which is an estimated distance between the GNSS satellite 84 and the GNSS receiver 22. Similar processes may be used by the GNSS receivers 24 and 26, which may obtain pseudo-ranges for the satellites 82 and 84. For example, the GNSS receiver 24 may obtain pseudo-ranges PR1_B and PR2_B for the satellites 82 and 84, respectively. Similarly, the GNSS receiver 26 may obtain pseudo-ranges PR1_C and PR2_C for the satellites 82 and 84, respectively. Although two satellites and three GNSS receivers are described in detail, in some embodiments, there may be several more GNSS receivers and/or satellites that may be used or required.

Figure 3:
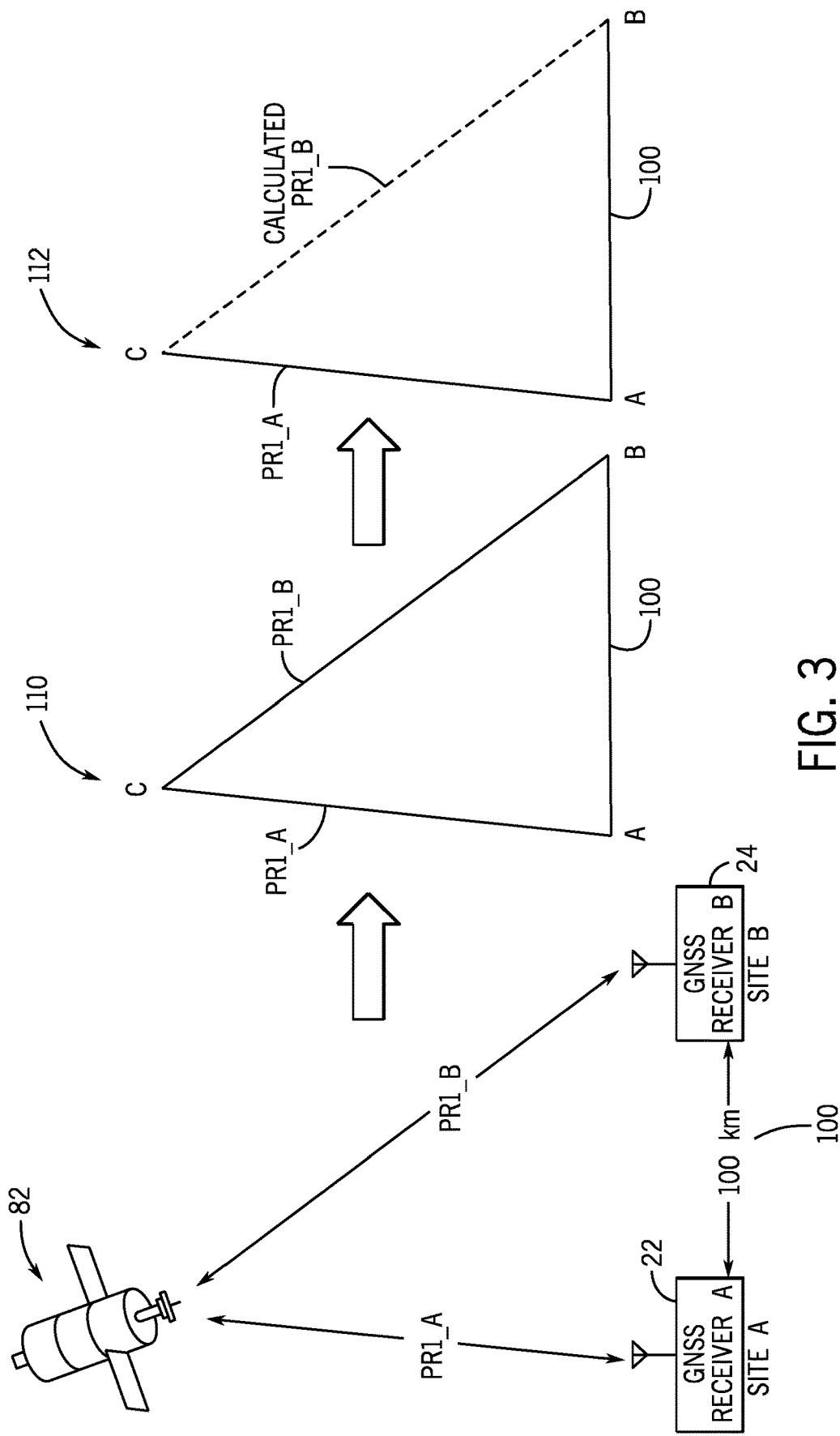
FIG. 3 is a diagram illustrating a satellite signal in common view of two GNSS receivers at two separate sites, in accordance with an embodiment of the present disclosure.

Using a combination of the pseudo-ranges, the locations of the GNSS receivers 22, 24, and 26, and the locations of the GNSS satellites 82 and 84, the GNSS receivers 22, 24, and 26, or another electronic device, may determine whether spoofing has occurred. Accordingly, FIG. 3 illustrates a diagram of calculations that may be used to determine whether spoofing has occurred.

As mentioned above, the GNSS receiver 22 may obtain a first receiver location (e.g., latitude, longitude, altitude, etc.) indicating where the GNSS receiver 22 is installed. Similarly, GNSS receiver 24 may obtain a second receiver location (e.g., latitude, longitude, altitude, etc.) indicating where the GNSS receiver 24 is installed. The GNSS receivers 22 and 24 may communicate their respective locations to each other, for example, via respective communication circuitries 54. Further, the GNSS receivers 22 and 24 may calculate a distance 100 between the location of the GNSS receiver 22 and the location of the GNSS receiver 24 based on the received location data. Further, the GNSS receivers 22 and 24 may calculate pseudo-ranges PR1_A and PR1_B for the GNSS satellite 82, as described in FIG. 2.

A triangle 110 illustrates the trigonometry of the locations of the GNSS receivers 22 and along with the location of the GNSS satellite 82. For example, in the triangle 110, the GNSS receiver 22 location may be 'A', the GNSS receiver 24 location may be 'B', and the GNSS satellite 82 location may be 'C'. Angles of the triangle 110 may be determined using trigonometric relations between the known locations A, B, and C, the distance 100, and the pseudo-ranges PR1_A and PR1_B.

As previously discussed, in some circumstances, GNSS signals from the GNSS satellite 82 could be spoofed or otherwise faulty. Accordingly, it may be desirable to verify the accuracy of the GNSS signals. In some embodiments, the known trigonometric relations of the triangle 110 may be utilized to verify the accuracy of GNSS signals. Accordingly, a triangle 112 illustrates a method of verifying the accuracy of the pseudo-range PR1_B data obtained by the GNSS receiver 24 based on data from the GNSS satellite 82 to the GNSS receiver 24.

In the triangle 112, the pseudo-range PR1_B as measured by the GNSS receiver 24 may be verified. To confirm that location data from the GNSS satellite 82 to the GNSS receiver 24 has not been spoofed, the GNSS receiver 22 may determine an expected range measurement (e.g., an expected pseudo-range "Calculated PR1_B") using the PR1_A data, the distance 100, and angles of the triangle 112. For example, the receiver 22 may determine the Calculated PR1_B as:

$$\text{Calculated PR1\_B} = sqrt\left(PR1_A^2 + c_{known}^2 - 2(PR1_A * c_{known}) * \cos(A_A)\right), \quad (1)$$

where $c_{known}$ is the distance 100 and $A_A$ is an angle inside the triangle 112 calculated using the locations A, B, and C.

To determine whether the GNSS receiver 24 has received spoofed data, the GNSS receiver 22 or another electronic device may compare the calculated PR1_B to the PR1_B measured by the receiver 24. When the calculated PR1_B and the measured PR1_B are within a threshold error of each other, the range measurements may be verified. However, if the calculated PR1_B and the measured PR1_B exceed the threshold error, the receiver 22 or another electronic device may determine that spoofing has occurred based on the comparison. In some embodiments, the threshold error may be based on the tolerances of GNSS communication, GPS location information tolerances, or both. Further, in some embodiments, the threshold error may be a user setting that is input by the user. Additionally, the threshold error may account for differences between the calculated PR1_B and the measured PR1_B as caused by the Doppler Effect, among other things.

In some embodiments, this concept may be expanded to a multitude of GNSS satellites in the satellite constellation 80 in common view of many GNSS receivers and taking place over more than 2 dimensions. By verifying multiple pseudo-ranges from geographically diverse GNSS receivers, the process may offer a robust integrity check. For example, in the triangle 112, it may be possible that the PR1_A data is spoofed, rather than the PR1_B data. This may cause the Calculated PR1_B data to be off, and may skew the calculations accordingly. Further, if both PR1_A and PR1_B are spoofed, then there may be little to no difference in the PR1_B data and the Calculated PR1_B data, despite the spoofing. Accordingly, in some embodiments, more than two GNSS receivers may be used to verify the accuracy of GNSS satellite data. For example, there may be 3, 4, 5, 10, 20, 30, 40, 50, 100, or any other number of satellites in the satellite constellation 80. Further, there may be any similar number of GNSS receivers. Using the methods described in relation to the triangle 112 for a larger number of GNSS receivers and GNSS satellites may improve the accuracy of the disclosed verification check. For example, in some embodiments, the method of the triangle 112 may be applied to a number of other GNSS receivers also receiving data from the GNSS satellite 82. If the other GNSS receivers produce calculated PR1_B data consistent with the calculated PR1_B data determined by the GNSS 22, then the confidence that the receiver 24 received spoofed data may be very high.

Additionally or alternatively, the GNSS data obtained by different GNSS receivers may be compared. In some embodiments, the navigation message may be compared to confirm that the GNSS receivers are obtaining a matching navigation message at a given time. For example, if the GNSS receiver 22 obtains a different navigation message at a given time than the GNSS receiver 24, it may be determined that one of the GNSS receivers 22, 24 may be obtaining spoofed data. To determine which of the GNSS receivers 22, 24 is obtaining spoofed data, the navigation message obtained by other GNSS receivers obtained at the given time may be compared. Using a "majority-rule"

method, anomalies in navigation message data may be identified as spoofed data. Further, in some embodiments, the GNSS satellite 82, or any other GNSS satellite, may send identical data in a "verification mode" to a number of GNSS receivers. Accordingly, any GNSS receiver that receives data other than the verification mode data sent by the GNSS satellite 82 may be identified as receiving spoofed data.

In some embodiments, the rate of change of measurements derived from signals and data transmitted by the GNSS satellite 82 may be small. This may be due to the physics of the GNSS satellite 82. For example, the GNSS satellite 82 may be orbiting earth on a known trajectory, and may have limited forces acting on it. Accordingly, any rate of change of measurements greater than what may be expected based on the physics of the GNSS satellite 82 may indicate that the signal is spoofed. It should be noted that the GNSS satellite 82 is referenced for convenience only, and that any GNSS satellite may be applicable to this method of verification or any method disclosed herein.

Figure 4:
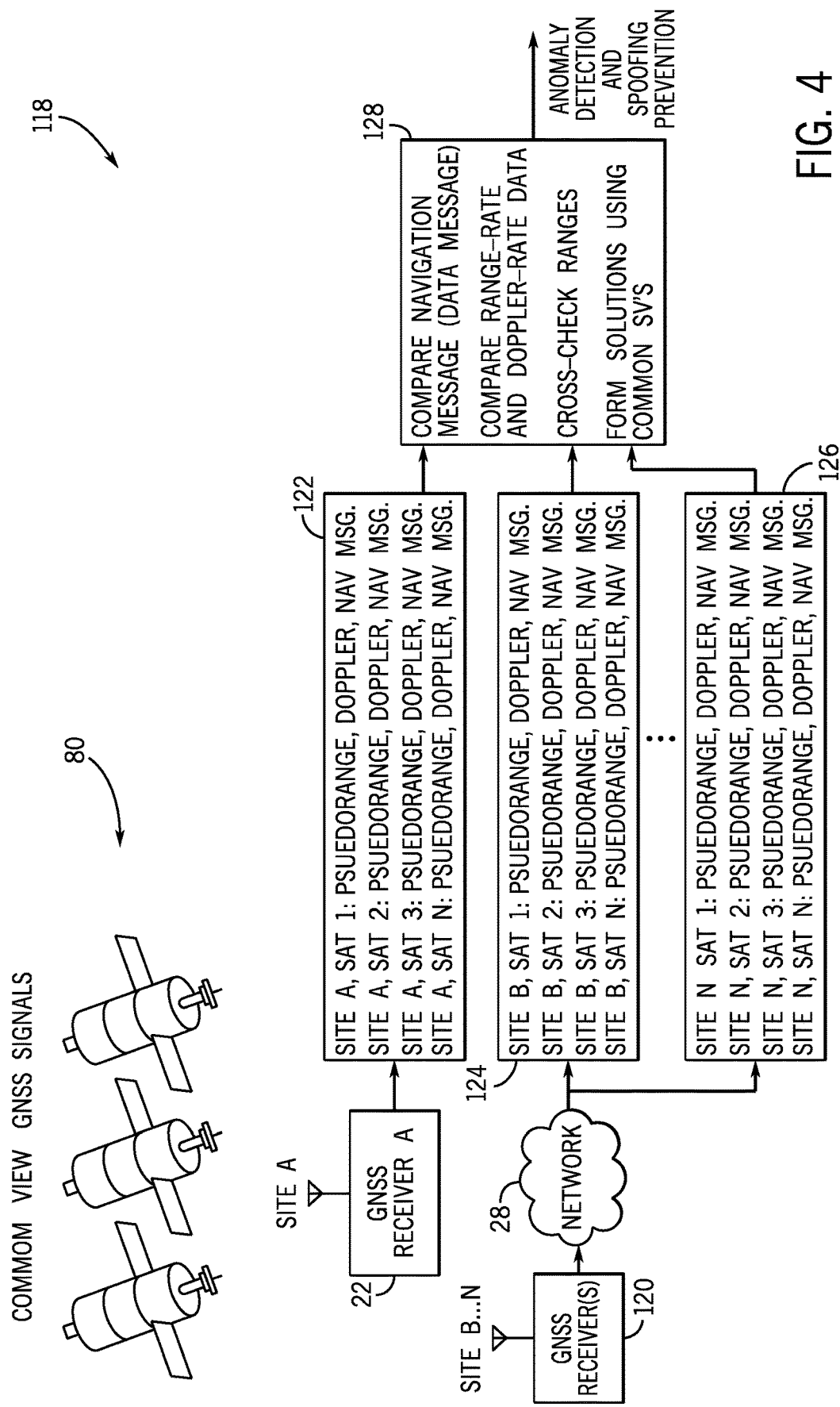
FIG. 4 is a data flow diagram of data used to determine spoofing of the GNSS satellite of FIG. 3, in accordance with an embodiment of the present disclosure.

Turning now to FIG. 4, a data flow diagram 118 of operations of the GNSS receiver 22 and any other GNSS receiver is described. The constellation of GNSS satellites 80 may send GNSS data to the GNSS receiver 22 and a number of other GNSS receivers 120 (e.g., the GNSS receivers 24, 26, and any other GNSS receivers). In some embodiments, the GNSS receivers 120 may be connected to the network 28. Further, the GNSS receiver 22 may also be connected to the network 28 (not shown). The GNSS receiver 22 may determine, based on the GNSS data received from the constellation of GNSS satellites 80, a number of observables 122 for the GNSS satellites in the constellation of GNSS satellites 80. For example, the observables 122 may include pseudo-ranges, Doppler Effect observations, navigation messages, or any other observables determined based off the GNSS signals received by the GNSS receiver 22. Similarly, a first GNSS receiver of the GNSS receivers 120 (e.g., the GNSS receiver 24 or 26) may determine a number of observables 124 for the GNSS satellites of the constellation of GNSS satellites 80 based on the GNSS signals received by the first GNSS receiver of the GNSS receivers 120. Indeed, there may be N GNSS receivers 120, some or all of which may similarly determine a number of observables 126.

The GNSS receivers 22 and 120, or any other electronic device, may then perform verification operations 128 based on the observables 122, 124, and 126. This may include the verifications illustrated in FIG. 3, as well as other verification methods. For example, the data from the observables 122, 124, and 126 (e.g., the navigation message, the range-rate, the Doppler-rate data, the pseudo-ranges and calculated pseudo-ranges, etc.) may be compared to determine whether any of the GNSS receivers 22 or 120 have been spoofed. Accordingly, anomaly detection and spoofing prevention measures may be utilized to identify anomalies and protect the GNSS receivers 22 and 120 from spoofed data.

Figure 5:
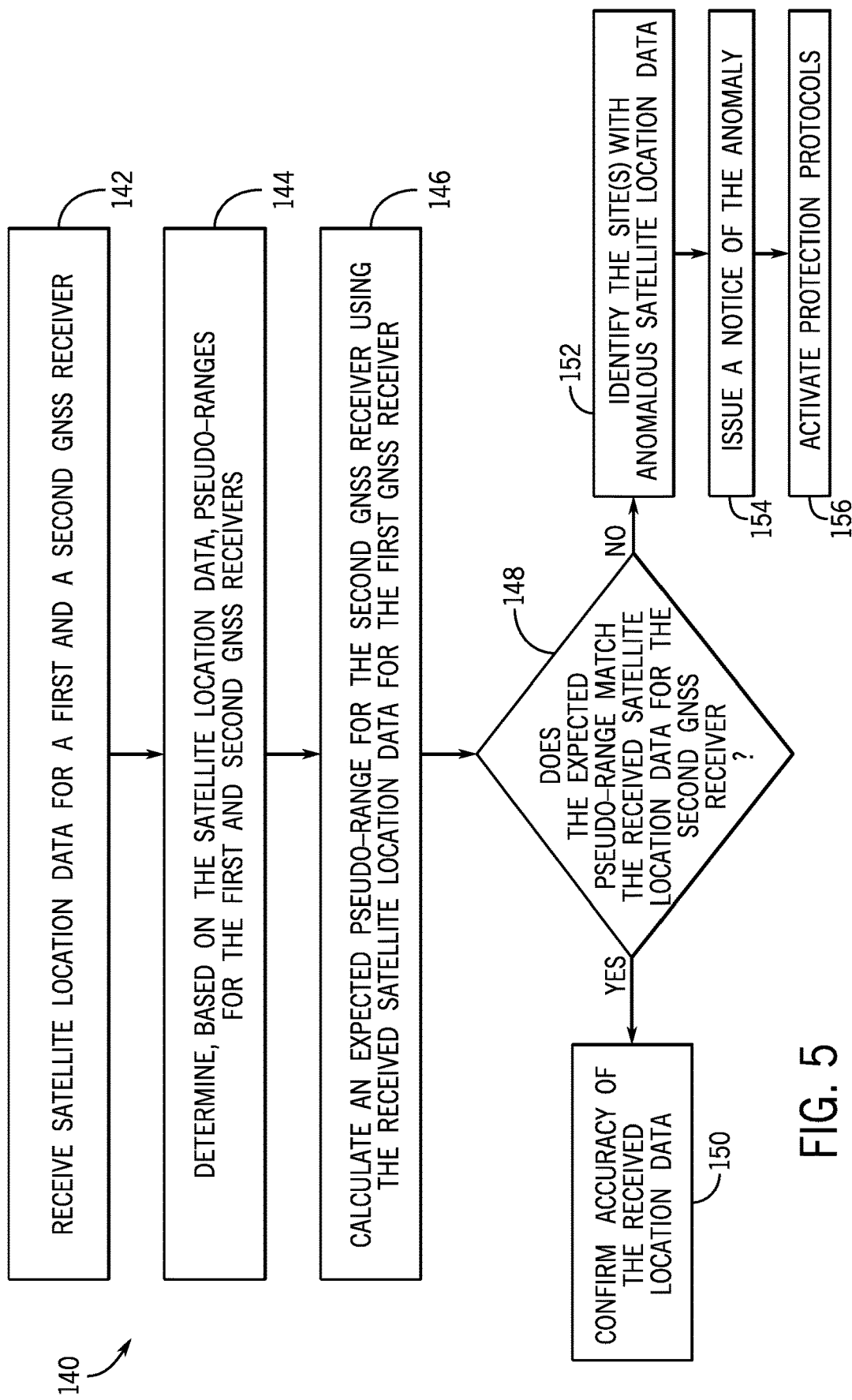
FIG. 5 is a data flow diagram of operations of the GNSS receivers of FIG. 1, in accordance with an embodiment of the present disclosure.

FIG. 5 illustrates an example method 140 that may be utilized by the GNSS receivers 22, 24, 26, 120, or any other electronic device that can receive the GNSS data to identify anomalies. It should be noted that the operations in the method 140 may be used by any appropriate device, and that the GNSS receivers 22 and 120 are not intended to be limiting. Further, the operations in the method are intended to be illustrative only, and there may be more or fewer operations than those disclosed. Further, the operations of the method 140 may be performed in any order, and the illustrated flow of operations is not intended to be limiting.

At block 142, the GNSS receivers 22 and 24 may receive satellite location data, for example from the GNSS satellite 82. In some embodiments, the satellite location data may include observables obtained or measured by each of the GNSS receivers 22 and 24. For example, the satellite location data for the GNSS receiver 22 may be the observables 122. The GNSS receiver 24 may have similar observables, for example the observables 124. At block 144, the GNSS receivers 22 and 24 may determine pseudo-ranges (e.g., PR1_A and PR1_B) to describe the distance between the GNSS satellite 82 and the GNSS receivers 22 and 24. At block 146, the GNSS receiver 22 may calculate an expected pseudo-range between the GNSS receiver 24 and the satellite 82 (e.g., the Calculated PR1_B) using the satellite location data received by the GNSS receiver 22 and the location data for the GNSS receives 22 and 24.

At block 148, the GNSS receiver 22, or any other electronic device may determine whether the expected pseudo-range for the GNSS receiver 24 (e.g., the Calculated PR1_B) matches the received satellite location data (i.e., the monitored PR1_B) for the GNSS receiver 24. In some embodiments, a threshold deviation may still be considered a match, and may account for slight differences in measurements and calculations. For example, the Doppler Effect or ionospheric distortion may cause slight variances between the Calculated PR1_B and the observed PR1_B. If a match is found, then the GNSS receiver 22, or other electronic device, may confirm that the data on the GNSS receiver 24 is not spoofed at block 150.

If a match is not found at block 148, however, then the GNSS receiver 22, or other electronic device (e.g., an IED), may identify the GNSS receiver 24 as a GNSS receiver receiving anomalous satellite signals at block 152. Accordingly, at block 154, a notice of the anomaly may be issued to a user or authority of the GNSS receiver 24. In some embodiments, the notice may be sent with a log of similar notices. Additionally or alternatively, the notification may be provided via a supervisory control and data acquisition (SCADA) system, the network 28, or any other suitable technique. In some embodiments, the user or authority may indicate actions to be taken in response to the anomaly. For example, the indication may be pre-programmed into the GNSS receiver 24. Additionally or alternative, the indication may be given in response to the anomaly.

Accordingly, at block 156, the GNSS receiver 24, or any other electronic device (e.g., an IED), may activate protection protocols. For example, in some embodiments, the GNSS receiver 24 may exclude use of timing information from the GNSS satellite 82, as it may be suspected to be spoofing. Additionally or alternatively, the GNSS receiver 24 may limit use of GNSS data to those originating from GNSS satellites of the GNSS satellite constellation 80 which are in common view to any of the geographically diverse GNSS receivers 120. This may ensure that the GNSS data is able to be verified, as described in the method 140. Further, in some embodiments, the protection protocols may include limiting the GNSS receivers used by a consumer. For example, GNSS receivers that have received spoofed data (e.g., the GNSS receiver 24) may be excluded from use, and only verified GNSS receivers may be used.

It should be noted that although the method 140 describes operations of the GNSS receivers 22 and 24 with respect to the GNSS satellite 82, other GNSS receivers and GNSS satellites may be used. For example, as described previously, the method 140 may provide more reliable results as more GNSS receivers are used to identify spoofed signals. Accordingly, the operations described in the method 140 may be utilized by any number of GNSS receivers, with respect to any number of GNSS satellites.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:
a memory; and
one or more processors operatively coupled to the memory, wherein the one or more processors are configured to execute instructions on the memory to cause operations comprising:
obtaining a first distance between a first Global Navigation Satellite System (GNSS) receiver and a second GNSS receiver;
obtaining, via the first GNSS receiver, first GNSS data indicating a first range measurement between a first GNSS satellite of a first GNSS constellation and the first GNSS receiver;
obtaining, via the second GNSS receiver, second GNSS data indicating a second range measurement between the first GNSS satellite and the second GNSS receiver;
calculating a first expected range measurement between the second GNSS receiver and the first GNSS satellite based at least in part on an angle opposite the first expected range measurement that is formed between the first GNSS receiver, the second GNSS receiver, and the first GNSS satellite, the first distance, and the first range measurement;
determining that spoofing of the first GNSS satellite has occurred based on a comparison between the first expected range measurement and the second range measurement; and
based on the determination that spoofing of the first GNSS satellite has occurred, limiting timing information of an electric power delivery system to timing information from a second GNSS satellite of the first GNSS constellation.

2. The electronic device of claim 1, wherein the first expected range measurement is calculated as:

Calculated $PR1\_B = \sqrt{PR1\_A^2 + c_{known}^2 - 2(PR1\_A \ast c_{known}) \ast \cos(A_A)}$ wherein Calculated $PR1\_B$ is the first expected range measurement, $PR1\_A$ is the first range measurement, $c_{known}$ is the first distance, and $A_A$ is the angle opposite the first expected range measurement that is formed between the first GNSS receiver, the second GNSS receiver, and the first GNSS satellite.

3. The electronic device of claim 1, wherein the first GNSS receiver is located in a first substation at a first known location and the second GNSS receiver is located in a second substation at a second known location, wherein the electronic device determines the first distance based on the first known location and the second known location.

4. The electronic device of claim 1, comprising calculating a second expected range measurement between the first GNSS receiver and the first GNSS satellite based at least in part on the first distance and the second range measurement.

5. The electronic device of claim 1, wherein the first range measurement is a first pseudo-range and the second range measurement is a second pseudo-range.

6. The electronic device of claim 5, wherein the one or more processors are configured to execute instructions on the memory to cause operations comprising:
determining that spoofing has occurred when a difference between the second pseudo-range and the first expected range measurement exceed an error threshold.

7. The electronic device of claim 1, wherein the one or more processors are configured to:
calculate a second distance between the first GNSS receiver and a third GNSS receiver.

8. The electronic device of claim 1, wherein the one or more processors are configured to execute instructions on the memory to cause operations comprising sending a notification indicating that spoofing has occurred.

9. The electronic device of claim 1, wherein the electronic device comprises an intelligent electronic device configured to control an operation of an electric power delivery system, and wherein the one or more processors are configured to execute instructions on the memory to cause operations comprising:
performing a control operation on the electric power delivery system based at least in part on the electric power delivery system timing information and one or more measurements of the electric power delivery system.

10. The electronic device of claim 9, wherein the control operation comprises tripping a circuit breaker based at least in part on the one or more measurements of the electric power delivery system being time stamped via the timing information.

11. A method, comprising:
obtaining a first distance between a first Global Navigation Satellite System (GNSS) receiver and a second GNSS receiver;
obtaining, via the first GNSS receiver, first GNSS data indicating a first range measurement between a first GNSS satellite of a first GNSS constellation and the first GNSS receiver;
obtaining, via the second GNSS receiver, second GNSS data indicating a second range measurement between the first GNSS satellite and the second GNSS receiver;
calculating a first expected range measurement between the second GNSS receiver and the first GNSS satellite based at least in part on an angle opposite the first expected range measurement that is formed between the first GNSS receiver, the second GNSS receiver, and the first GNSS satellite, the first distance, and the first range measurement;
determining that spoofing of the first GNSS satellite has occurred based on a comparison between the first expected range measurement and the second range measurement; and
based on the determination that spoofing of the first GNSS satellite has occurred, limiting timing information of an electric power delivery system to timing information from a second GNSS satellite of the first GNSS constellation.

12. The method of claim 11, comprising:
determining a difference value between the first expected range measurement and the second range measurement; and determining that spoofing has occurred when the difference value exceeds a threshold error value.

13. The method of claim 12, wherein the threshold error is preset according to tolerances of GNSS communication, Global Positioning System (GPS) location information, or any combination thereof.

14. The method of claim 12, comprising receiving a user input indicative of the threshold error value.

15. The method of claim 12, comprising verifying that spoofing has occurred based on a second expected range measurement between the second GNSS receiver and the first GNSS satellite calculated by a third GNSS receiver.

16. A non-transitory, computer readable medium comprising instructions that, when executed by one or more processors, cause operations comprising:
  obtaining a first distance between a first Global Navigation Satellite System (GNSS) receiver and a second GNSS receiver;
  obtaining, via the first GNSS receiver, first GNSS data indicating a first range measurement between a first GNSS satellite of a first GNSS constellation and the first GNSS receiver;
  obtaining, via the second GNSS receiver, second GNSS data indicating a second range measurement between the first GNSS satellite and the second GNSS receiver;
  calculating a first expected range measurement between the second GNSS receiver and the first GNSS satellite based at least in part on an angle opposite the first expected range measurement that is formed between the first GNSS receiver, the second GNSS receiver, and the first GNSS satellite, the first distance, and the first range measurement;
  determining that spoofing of the first GNSS satellite has occurred based on a comparison between the first expected range measurement and the second range measurement; and
  based on the determination that spoofing of the first GNSS satellite has occurred, limiting timing information of an electric power delivery system to timing information from a second GNSS satellite of the first GNSS constellation.

17. The non-transitory, computer readable medium of claim 16, wherein the instructions, when executed by the one or more processors, cause operations comprising sending a notification indicating that spoofing has occurred.

18. The non-transitory, computer readable medium of claim 16, wherein the instructions, when executed by the one or more processors, cause operations comprising:
  performing a control operation on the electric power delivery system based at least in part on the electric power delivery system timing information and one or more measurements of the electric power delivery system.

19. The non-transitory, computer readable medium of claim 18, wherein the control operation comprises tripping a circuit breaker based at least in part on electric power delivery system measurements time stamped via the timing information.

20. The method of claim 15, wherein verifying that spoofing has occurred based on a second expected range measurement between the second GNSS receiver and the first GNSS satellite calculated by a third GNSS receiver comprises:
  obtaining a third distance between the second GNSS receiver and a third GNSS receiver;
  obtaining, via the third GNSS receiver, third GNSS data indicating a third range measurement between the first GNSS satellite and the third GNSS receiver;
  calculating the second expected range measurement between the second GNSS receiver and the first GNSS satellite based at least in part on an angle opposite the second expected range measurement that is formed between the second GNSS receiver, the third GNSS receiver, and the first GNSS satellite, the third distance, and the third range measurement; and
  verifying that spoofing the first GNSS satellite has occurred based on a comparison between the second expected range measurement and the second range measurement.

* * * * *